Patented Mar. 14, 1944

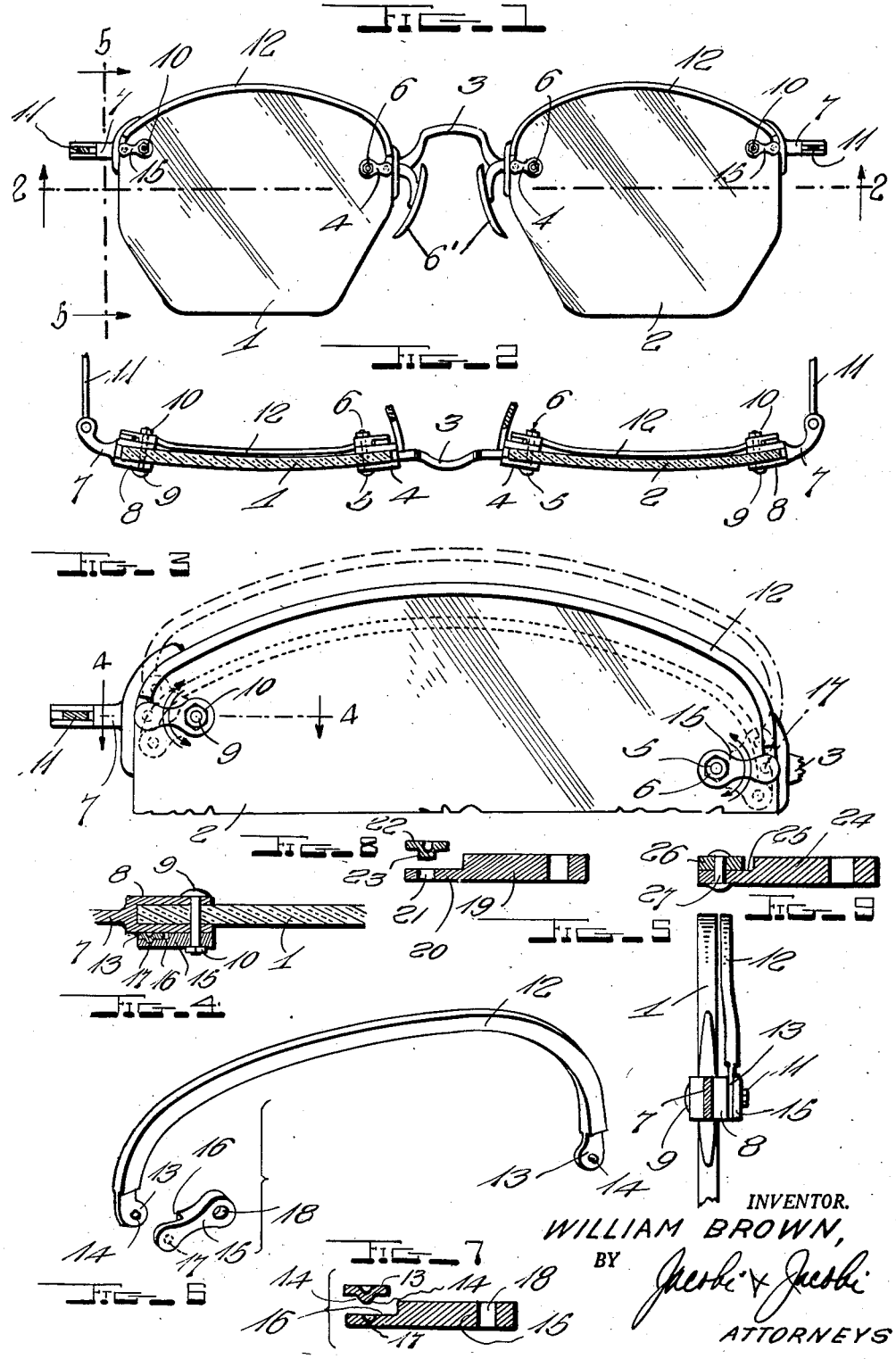

2,344,230

UNITED STATES PATENT OFFICE 2,344,230

ADJUSTABLE AND REMOVABLE BRACE FOR FRAMELESS EYEGLASSES

William Brown, Wilkes-Barre, Pa., assignor to Shock Proof Lens Guard, Inc., Kingston, Pa., a corporation of Pennsylvania Application July 9, 1941, Serial No. 401,650

12 Claims. (Cl. 88—41)

My invention relates to new and useful improvements in eyeglass construction and more particularly to eyeglasses of the frameless or rimless spectacle type, the primary object of the invention being to provide an adjustable and removable brace which is a marked improvement upon the construction previously invented by me and disclosed in Patent No. 2,197,682, issued to me April 16, 1940.

While the brace illustrated in my previous patent, aforesaid, accomplishes certain results, it has been found that considerable difficulty is encountered in the application of the brace to the lenses, particularly in the conforming of the shape of the brace to the shape of the upper edges of the lenses. Moreover, in applying the brace shown in said patent, lenses are frequently broken due to the direct connection of the brace to the straps of the bridge and the temple support. Still further, the brace of my former patent is incapable of ready adjustment, due to the method of mounting and, likewise, due to the method of mounting same, the brace will not absorb shocks incident to dropping or rough handling of the glasses.

It is the object, therefore, of my present invention, to overcome these various disadvantages encountered in the application to use of my former invention.

A further object of the invention resides in the provision of a brace which is not only removable but which when first applied may be readily adjusted to various positions to permit the same to conform to the shape of the upper portion of the lenses to which the brace may be applied.

A still further object resides in the provision of a brace which has substantially a hinge type of connection with its supports on the lenses, thereby permitting shock absorption.

Still another object of the invention resides in providing a brace which, although tending to protect the lenses and also prevent crackage or breakage due to undue bending of the bridge in any direction, will, nevertheless, avoid strain on the lenses and minimize the possibilities of cracking said lenses.

Still another object of the invention resides in providing a brace of the character mentioned which is flexible, adapted to all styles of straps or shapes of lenses and which is so constructed and designed as to avoid the necessity of preparing "lefts" and "rights" for the glasses to which the same are adapted to be applied.

A still further object resides in providing a brace which will be neat-appearing, inexpensive to manufacture and one which may be readily applied or mounted by anyone, even though inexperienced in the mechanics of eyeglass assembly.

With these and numerous other objects in view, my invention consists of the novel features of construction, combination and arrangement of parts as will be hereinafter referred to and more particularly pointed out in the specification and claims.

In the accompanying drawing, forming a part of this application,

Figure 1 is an elevational view of a pair of glasses with my improved brace applied to use thereon, looking from the inside and with the temples in section;

Figure 2 is a horizontal section therethrough as seen on the line 2—2 of Figure 1, looking upwardly and with the temples directed forwardly;

Figure 3 is an enlarged inner elevational view of one of the lenses with my attachment applied to use thereon, showing in dotted lines and in dot-and-dash lines, the extreme positions of the brace through the movement or adjustment thereof at the hinged connection, the temple being shown in section;

Figure 4 is a horizontal section therethrough as seen on the line 4—4 of Figure 3, looking in the direction of the arrows;

Figure 5 is a vertical section taken substantially on the line 5—5 of Figure 1;

Figure 6 is a detailed perspective view of the brace and coacting link shown in juxtaposition;

Figure 7 is a horizontal section through the link and the one ear of the brace with the parts separated to show particularly the coacting parts thereof;

Figure 8 is a similar view showing a slight modification of the invention; and

Figure 9 is a similar view showing a still further modification of the connection between the link and the brace.

Considerable difficulty has been encountered in the use of frameless or rimless glasses, both of the nose and spectacle types. As aforesaid, I have made an invention, as disclosed in Patent No. 2,197,682, issued to me April 16, 1940, to overcome some of the difficulties encounted. It has been found, however, that in applying the brace of said patent to the lenses, great difficulties were encountered in the adjustment thereof to conform to lenses of various shapes and the more or less rigid connection not only prevented simple adjustments, but also frequently caused the cracking of the lenses. Considerable time is consumed in carefully applying and endeavoring to adjust the braces of said patent on lenses in the mounting of the device, and the necessity for having "rights" and "lefts" to be applied to the respective right and left lenses caused delays in the mounting of the braces. Furthermore, the brace of the patent aforesaid did not provide for the absorption of shock, incident to dropping or rough handling of the glasses.

My present invention will overcome these various difficulties and in describing the same I shall refer to the drawing in which similar reference characters designate corresponding parts throughout the several views.

The lenses, which may be of any size, shape or design, are designated by the numerals 1 and 2, respectively, the same being connected by the nose piece or bridge 3, which is of the conventional type having the pairs of straps 4 straddling the inner ends of the lenses and secured to the latter by means of screws 5 extending therethrough and locked together by the nuts 6. The numeral 6' represents the nose guards which may be of the conventional or any desired type.

My invention being particularly applicable to rimless glasses of the spectacle type, although not necessarily limited to this type, I have shown the conventional temple supports 7 with their pairs of straps or ears 8 straddling the outer ends of the lenses and secured to the latter by means of the screws 9 and nuts 10. The temples, pivotally carried on the supports 7, are designated by the numeral 11.

I provide for each lens a brace 12 which is formed of flexible, springy and light metal which, as shown in the drawing, may be substantially rectangular in cross section, although I do not wish to be limited to this particular shape, as the brace may be round, oval or any other design in cross-section, without affecting the invention. The brace is somewhat arcuate in design, but being formed of flexible springy metal may be readily shaped to conform to any shape of lens. The ends of this brace 12 are reduced to form ears 13 and the one face of each ear is formed with an outstanding stud or the like 14, which may be formed by indenting the opposite face of the ear, as shown in Figure 7 of the drawing, or otherwise, as desired.

The ends of each brace are adapted to be connected to a pair of metal link members 15. The outer end of each link member is offset as shown at 16 to form a reduced portion thereon adapted to readily receive thereagainst the coacting ear 13 of the adjacent end of the brace 12, as clearly shown in Figures 4, 6 and 7. The inner face of the reduced portion 16 of the link 15 is provided with a depression 17 which is adapted to receive therein the stud 14 projecting from the ear 13.

The opposite ends of the link 15 are adapted to be secured to the screws 5 and 9 which respectively secure the straps of the bridge and temple supports to each lens. To this end each link 15 at the end thereof opposite the reduced portion 16 thereof is provided with an opening 18 extending completely therethrough, as shown in Figure 7 of the drawing, and this opening is slightly larger in diameter than the diameter of the screws 5 and 9 which are adapted to secure these links in place. It may also be stated that in carrying out the invention, it is necessary to use screws, such as those designated as 5 and 9, which are slightly longer than the screws ordinarily used in mounting lenses, inasmuch as the thickness of the links 15 must be compensated for. These links are mounted on the screws 5 and 9 and the nuts 6 and 10, respectively, and applied, the links overlying the straps of the bridge and temple supports, respectively. However, in applying the links to the respective screws, it is not necessary that the braces be simultaneously applied. In fact, the links are first applied with the screws home lightly, whereupon the braces are then applied to the rear faces of the lenses and the studs 14 engaged in the depressions 17 to loosely link the elements together. Then, the braces are adjusted to conform to the contour of the upper edges of the lenses. When this has been accomplished, which may be done with little effort and time, the screws are turned home tightly and the glasses with the braces are ready for use. The simplicity with which this adjustment of the brace may be accomplished is readily observed from the dotted and dot-and-dash outlines in Figure 3 of the drawing, which well illustrate the extreme positions to which the brace, by means of pivoting the link members, may be directed.

Hereabove, I have described one means of connecting the link member to the ends of the brace, although I do not wish to be limited to this particular construction. For instance, in Figure 8 I have shown a slightly modified form of connecting means, wherein the link member, designated by the numeral 19, has the reduced portion 20 thereof in which is provided an opening 21 extending entirely through the link member. The ear 22 of the brace has the stud 23 projecting therefrom which is adapted to enter the opening 21. This provides a similar loose link connection between the brace and the link and for certain purposes this modified form may be more desirable.

In Figure 9 I have shown a still further modified form of connection in which the link member, designated by the numeral 24, has the reduced portion 25 against which rests the ear 26 of one end of a brace. This ear 26 and the reduced end 25 of the link member are secured together by a stud 27 which has the ends thereof upset in rivet fashion, although a loose or pivoted connection is provided. This constitutes substantially a hinge connection, although permanently securing the elements together. For certain purposes, this type of connection may be found more desirable.

As aforesaid, in each instance, the opening in the link member, through which means the same is mounted on the screw, is slightly larger in diameter than said screw, permitting ready movement of the link member and adjustment of the brace both laterally and longitudinally. This also assists in the absorption of shocks, incident to the dropping of the glasses or the rough handling thereof.

It will be noted that this particular brace is disposed on the inside of the lens at the upper periphery thereof and designed to conform to the upper peripheral edge of said lens, being slightly spaced from the latter. It may, however, as shown in my former patent, be made to overlie the upper peripheral edge of the lens. It will further be seen that my improved brace as herein presented is capable of application to use on glasses wherein the mountings are applied to the lenses either at the centers thereof or above the centers, that is, either to glasses of the full-view type or otherwise. Likewise, this improved type of brace may be applied to new or old rimless glasses and in view of its simple and ready application to use, does not require the services of a mechanical expert for mounting.

From the foregoing description of the construction of my improved invention, the method of applying the same to use and the advantages thereof will be readily appreciated and it will be seen that I have provided a simple, inexpensive and efficient means for carrying out the numerous objects of the invention.

While I have particularly described the elements best adapted to perform the functions set forth, it is obvious that various changes in form, proportion and in the minor details of construction may be resorted to without departing from the spirit or sacrificing any of the principles of the invention.

What I claim is:

1. In eyeglass construction, including a pair of lenses, a bridge member having lens-engaging straps, and temple supports having lens-engaging straps; brace bars for extending along margins of said lenses between the bridge member and the temple supports, link members, means pivotally connecting outer portions of said link members with the ends of said brace bars and constituting outer axes therefor, and means for securing the straps of said bridge member and temple supports to the lenses engaging the inner portions of said link members and constituting inner axes for the latter parallel to the outer axes thereof.

2. In eyeglass construction, including a pair of lenses, a bridge member, and temple supports; brace bars for extending along margins of said lenses between the bridge member and the temple supports, link members pivoted at their outer ends to ends of said brace bars for tilting adjustment about outer horizontal axes, and means for securing said bridge member and said temple supports to said lenses passing through said link members and serving to pivotally mount the latter for tilting adjustment about inner horizontal axes parallel to the aforesaid outer horizontal axes.

3. In eyeglass construction, including a pair of lenses, a bridge member, and temple supports; brace bars for extending along margins of said lenses between said bridge member and said temple supports, link members pivoted at their outer ends to ends of said bars for tilting adjustment about outer axes and extending inwardly from the ends of the brace bars, and means for securing said bridge member and said temple supports to said lenses, said means extending through the inner ends of said link members and constituting pivots mounting the link members for tilting adjustment about inner axes parallel to the outer axes, and said means when effectively secured also serving to firmly retain said link members and brace bars in set positions.

4. In eyeglass construction including a pair of lenses, a bridge member, and temple supports; brace bars for extending along margins of the lenses between the bridge member and the temple supports, link members pivoted at their outer ends to ends of said brace bars for vertical tilting adjustment about outer horizontal axes and means pivotally connecting inner ends of said link members with the bridge member and the temple supports, respectively, for vertical tilting adjustment about inner horizontal axes parallel to the aforesaid outer horizontal axes.

5. In eyeglass construction, including a pair of lenses, a bridge member having arms overlapping portions of said lenses, and temple supports having arms overlapping portions of said lenses; brace bars for extending along margins of said lenses between said bridge member and temple supports, link members pivoted at their outer ends to ends of said brace bars for tilting adjustment about outer horizontal axes and extending inwardly of said bars and longitudinally of the arms of the bridge member and temple supports against outer faces of said arms, means extending through said arms, lenses and link members securing said arms and lenses together and simultaneously forming pivots mounting said link members for tilting adjustment about inner horizontal axes parallel to the aforesaid outer horizontal axes and means engaging the last mentioned means for securing the link members in set positions of angular adjustment.

6. In eyeglass construction, including a pair of lenses, a bridge member, temple supports and means for detachably securing said bridge member and temple supports to said lenses; brace bars for extending along margins of said lenses between said bridge member and temple supports, link members pivoted at their outer ends to ends of said brace bars for tilting adjustment about outer horizontal axes, said means securing said bridge member and temple supports to said lenses also forming means for detachably and pivotally mounting the inner ends of said link members and permitting tilting adjustment of the latter about inner horizontal axes parallel to the aforesaid outer axes.

7. In eyeglass construction, including a pair of lenses, a bridge member, temple supports and means detachably securing said bridge member and temple supports in engagement with said lenses; brace bars for extending along margins of said lenses between the bridge member and temple supports, said brace bars having their ends reduced to form ears, links extending inwardly from the ends of said bars having their outer ends reduced to form ears pivoted to the ears of said brace bars and mounting the links for vertical tilting adjustment about outer horizontal axes, the means for securing said bridge member and said temple supports to said lenses being also engaged with inner ends of said links and forming pivots detachably and pivotally mounting said links for vertical tilting adjustment about inner axes parallel to the outer axes.

8. In rimless eyeglass construction, a lens, a brace bar for extension along a marginal edge thereof, a link member pivotally engaged at one end to one end of said bar for tilting adjustment about an outer axis, means for pivotally and detachably securing the opposite end of said link member to said lens for tilting adjustment about an inner axis parallel to the first mentioned axis, and means for securing the opposite end of the bar to said lens.

9. In rimless eyeglass construction, a lens, a brace bar for extension along a marginal edge thereof, a link member pivotally engaged at its one end to one end of said bar, for tilting adjustment about an axis, means for pivotally and detachably securing the opposite end of said link member to said lens for tilting adjustment about an axis parallel to the first mentioned axis, and means for securing the opposite end of said brace bar to the lens.

10. In rimless eyeglass construction, a brace for a lens comprising a bar adapted for extension along a margin of the lens between the nasal and the temporal ends thereof, and link members pivoted at their outer ends to the ends, respectively, of said bar for vertical tilting adjustment about outer horizontal axes, said link members having their inner ends adapted to be pivotally mounted for vertical adjustment about inner horizontal axes parallel to said outer axes.

11. In rimless eyeglass construction, a brace for a lens comprising a bar for extension along the upper margin of said lens, said bar having downwardly extending end portions, and link members pivoted at their outer ends to the ends of said bar for vertical tilting adjustment about outer horizontal axes, the inner ends of said link members being formed with means adapting same to be pivotally mounted for vertical tilting adjustment about inner horizontal axes parallel to the aforesaid axes.

12. In rimless eyeglass construction, a brace for a lens comprising a bar adapted to conform to the upper margin of a lens, said bar having downwardly extending portions, and link members pivoted at their outer ends to the respective ends of said bar and extending inwardly therefrom for vertical tilting adjustment about outer horizontal axes, the inner ends of said links being formed each with an opening adapted to receive means for detachably and pivotally securing the same on inner horizontal axes parallel to said outer axes.

WILLIAM BROWN.